Dec. 29, 1959
M. J. DALTON
2,919,071
HOSE AND NOZZLE ATTACHMENT
Filed July 26, 1954
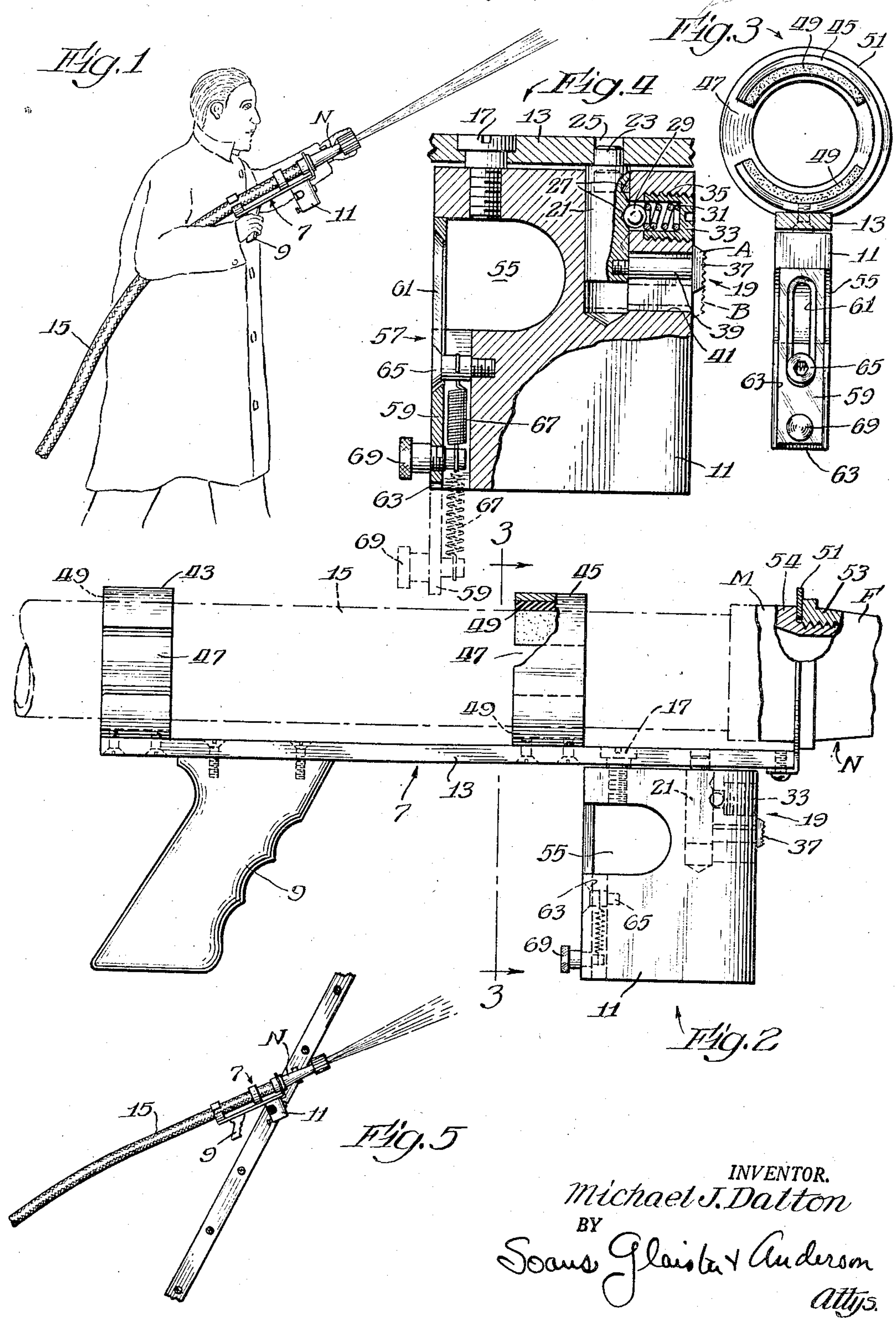
INVENTOR.
Michael J. Dalton
BY
Soans Glaister & Anderson
Attys.

2,919,071

HOSE AND NOZZLE ATTACHMENT

Michael J. Dalton, Barrington, Ill., assignor to Great Lakes Fire Equipment Company, Barrington, Ill., a partnership Application July 26, 1954, Serial No. 445,786

5 Claims. (Cl. 239—273)

The present invention relates to an attachment for hoses and nozzles and more particularly to a fire hose nozzle attachment which will facilitate the handling of fire hoses and which will greatly increase the control of the stream from the nozzle.

The handling of fire hoses by firemen has always been an extremely difficult and hazardous operation. The hazards and difficulties involved rather than decreasing over the years have increased due to the fact that hoses have become larger, pumping and equipment more powerful. These developments have increased water pressures and increased the reaction forces resulting from playing the stream water from the hose nozzle with a consequent increase in the difficulties involved in handling the hose. Further, during the last few years, there have been made available adjustable nozzles which make it possible to change the character of the spray from the nozzle so as to accomplish most efficient fire fighting and this also requires attention from the nozzleman.

Under most conditions, it requires two or three firemen to handle a hose at all times. The first man holds onto the hose at the nozzle and directs the water at the proper point. The second fireman stands directly behind the nozzleman and grabs the hose as best he can to steady it and to help to move it as necessary. The third man who is required with large hoses is stationed several feet behind the other men and helps drag the hose on long moves. Actually, with known hose and nozzle constructions, it is about all that the nozzleman can do to control the stream because of the insecure grip that is provided, especially after the hose and nozzle have become wet and slippery. Thus, the second man must grip the hose in his arms and carry the main weight of the hose.

In the past, there have been provided various mechanical clamps and handles to facilitate hose handling, but none of them have worked out in practice. The reason for this was that there were no provisions to integrate them with the hose and nozzle in such a manner that they would facilitate hose handling and eliminate some of the manpower required to handle the hose and nozzle.

The principal objects of the present invention are the provisions of a fire hose attachment which is of rugged construction and which will minimize the difficulties in handling fire hose either from a standing position or on a ladder, as well as making possible more accurate direction of the stream and facilitating the control of the hose nozzle adjustment. Other objects and advantages of the invention will become known by reference to the following description and the accompanying drawings.

In the drawings:

Figure 1 is a pictorial representation of the manner in which a single fireman can handle a fire hose through the use of a hose and nozzle attachment embodying various features of the present invention;

Figure 2 is an elevational view of the embodiment of the hose and nozzle attachment illustrated in Figure 1;

Figure 3 is a sectional view taken along lines 3—3 of Figure 2;

Figure 4 is an enlarged view showing the details of the forward handle of the hose and nozzle attachment illustrated in the preceding figures; and Figure 5 is a view showing the adaptability of the hose and nozzle attachment illustrated in the drawings for use in connection with fire ladders.

Basically, the hose and nozzle attachment of the present invention takes particular advantage of spaced-apart hand grips which are connected together by a rigid member to provide pivot points for use in handling the hose. Preferably, the attachment of the present invention is associated with the nozzle of the hose in such manner as to be held in substantially rigid relation therewith and includes improved means for readily attaching and detaching the attachment from the hose and nozzle.

In the illustrated embodiment of the invention, the hose nozzle attachment 7 includes a pair of aligned hand grips 9 and 11 which extend radially from the hose and which are interconnected by a rigid member 13 which is adapted to extend longitudinally along the hose indicated as 15 in the drawings. Both of the hand grips 9 and 11 are preferably shaped to comfortably fit the hand. In the illustrated embodiment, the hand grip 9 provides a simple pistol grip and the hand grip 11 is rounded to conform to the hand but is of a special construction which will be described.

One of the hand grips 9 and 11 is preferably pivotally connected to the member 13 in order that the hose may be swiveled about the axis provided by the hand grip in the event that the hose is used on a ladder in a manner which will be described (see Fig. 5). Preferably, the forwardmost hand grip 11 is pivoted and this is illustrated in the drawings. However, it will be obvious that either of the grips 9 or 11 can be pivoted but a somewhat more efficient use of reaction forces and leverage results when the forward grip 11 provides the swivel axis.

In the drawings, the specific pivoting arrangement for the forward hand grip 11 includes a pivot 17 which interconnects the rearward end of the hand grip 11 to the longitudinal member 13. In the drawings, the pivot 17 comprises a machine screw which is secured in the hand grip 11 but which is free to rotate in the member 13. The forward side of the hand grip 11 is detachably connected to the member 13 by means of a latch indicated generally as 19.

The latch 19 illustrated, includes a locking pin 21 which may be generally cylindrical in shape and which includes an engaging end 23 of reduced diameter which is adapted to slide into a hole 25 provided in the member 13. The locking pin 21 includes two depressions or hollows 27 which are aligned along the axis of the locking pin 21 so as to be engaged by detent ball 29 which is biased into engagement with the pin 21 by means of a spring 31. The spring 31 is held in place by a set screw 33, the set screw 33, the ball 29, and the spring 31 being disposed in a passageway 35 provided in the hand grip 11 as illustrated in Figures 3 and 4.

Movement of the end 23 of the locking pin 21 into and out of engagement with the hole 25 is accomplished by a latch handle 37 which is interconnected to the locking pin 21 by a member 39. The member 39 is adapted to slide from the position marked A in the drawings to the position marked B through a slot 41 provided in the handle 11.

In operation, if it is desired that the handle 11 be rigidly connected to the member 13 it is only necessary to raise the latch handle 37 which in turn moves the end 23 of the pin 21 into engagement with the hole 25. If it is desired for the handle 11 to pivot freely about the axis provided by the pivot 17, it is only necessary to depress the latch handle 37 to disengage the pin from the hole 25. In each instance, the pin is held in the desired location by means of the locking ball 29 which is biased into one of the depressions on the locking pin 21.

In order to connect the nozzle and hose attachment 7 to the hose, there are provided in the illustrated embodiment, a pair of cylindrical rings 43 and 45 which are spaced-apart along the member 13 and connected thereto. The cylindrical members 43 and 45 are each provided with an opening 47 at one side thereof as illustrated in Figures 2 and 3, the opening being proportioned to admit a piece of flattened out fire hose. The inner surfaces of the cylindrical members 43 and 45 may be proportioned to exactly fit the hose in its expanded condition, however, it is desirable to make the attachment 7 suitable for use with different sized hoses. This is simply accomplished in the illustrated embodiment by making the diameter of the members 43 and 45 large enough to accommodate the largest sized hoses, and then providing arcuate pieces of rubber or like resilient material 49 which are cemented or otherwise attached to the members 43 and 45 and which are so proportioned as to grip the hose 15 tightly as the hose is inflated to its full diameter as when it is operating under pressure.

The forward end of the member 13 in the illustrated embodiment, is provided with a nozzle ring 51 whose central portion is cut out to receive the threaded portion of the male connector M of the hose 15, the ring 51 bearing against the shoulder provided between the threaded portion 53 and the body 54 of the male connector M. The ring 51 is of relatively thin construction so that it does not interfere with the connection between the male member M of the hose coupling and the female member F which is a part of the nozzle. Depending upon the nozzle construction, it may be necessary to provide gaskets on the sides of the ring 51 to seal the connector so as to prevent leakage of water, and this may be readily accomplished with standard gasket material if required.

The provision of the nozzle ring 51 is not essential. However, it does facilitate the provision of a substantially rigid connection between the nozzle attachment 7 and the nozzle N. If the nozzle ring 51 is not employed it is desirable to position the forward cylindrical member 45 at a point adjacent the forwardmost end of the member 13 so that it will butt against the rearward end of the male coupling M of the hose.

In order that the attachment may also have utility when the hose is being used on a ladder, the forward hand grip 11 is provided with a cut-out portion 55 in its rearward side which is proportioned to fit around one of the rungs on a ladder with which it is to be used (Fig. 5). The cut-out portion 55, illustrated, is generally arcuate in shape on its forward end so as to provide a smooth bearing surface on the rung of the ladder to facilitate ease of movement of the hose nozzle about the axis of the rung and its rearward end is closed by a spring actuated latch 57 which includes, in the illustrated embodiment, a generally flat plate 59 having a slot 61 running longitudinally thereof. The plate 59 is disposed in a recess 63 in the rearward end of the handle 11 for sliding movement and is held in place by a machine screw 65 rigidly positioned in the handle 11, the plate 59 sliding along the recess with the screw 65 in sliding engagement with the slot 61. The plate 59 is biased into the closed position by means of a spring 67 (Fig. 3), one end of which is connected to the machine screw 65 and the lower end of which is connected to the inner end of a shoulder screw 69 which is disposed through the plate 59. The outer end of the shoulder screw 69 provides a convenient handle by which the plate 59 can be moved downwardly against the biasing action of the spring 67 to open the cut-out portion 55 to permit the hand grip 11 to be fitted around a ladder rung (Fig. 5).

In use, the hose 15 and attachment 7 are assembled, as before described, while the hose is in a flattened condition. The nozzle ring 51 is placed intermediate the nozzle N and the coupling M on the hose.

If the hose is to be used by the fireman from a standing position the rearward hand grip 9 which is positioned below the hose 15 is grasped in one hand by the fireman and the hose is clamped between the arm of the fireman and his body (Fig. 1). This position provides a steady support for the hose under substantially all conditions. Adjustment of the spray of the hose nozzle may be accomplished by the fireman's free hand (Fig. 1) or, in the event that the nozzle is to be moved either up or down or from side to side, the fireman grasps the forward handle 11 which gives him a solid grip on the assemblage and permits him to apply leverage about the pivot point provided by the rearward hand grip 9. In one practical embodiment of the invention it has been found that the distance between the hand grips should preferably be in the neighborhood of 12 to 15 inches for the average sized man, however, the distance is not critical. The hand grips 9 and 11 make it possible for a man to exert substantial forces on the hose either in a forward or rearward direction as well as in the up and down and side to side directions. This has made possible the convenient handling of the hose by a single man.

In the event that the hose is to be used from a ladder (see Fig. 5), the hose nozzle is placed between the ladder rungs, the plate 59 is pulled down against the tension of the spring 67 to open the cut away portion 55 so that the hose can be fitted over the ladder rung. This provides free swiveling action in a vertical plane. In order that the hose may swivel in a horizontal plane it is only necessary to depress the latch handle 37 thereby withdrawing the locking pin 21 from the hole 25 in the member 13. This permits free swiveling in a horizontal plane about the axis provided by the pivot 17.

While only one specific embodiment has been described, it will be clear that various mechanical variations may be made without departing from the scope of the invention.

I claim:

1. In combination with a hose and nozzle, a member which extends longitudinally of said hose from a point adjacent said nozzle rearwardly along said hose, means attaching said member to said hose so that it is held in a substantially fixed relation to said nozzle, a pair of hand grips attached to and in aligned relation along said longitudinal member and positioned to extend radially of said hose, one of said hand grips being located adjacent the rearward end of said nozzle, and the other of said hand grips being located at a point to the rear of said one hand grip and spaced therefrom, said one hand grip being attached to said longitudinal member by a pivotal connection and including a cut-away portion proportioned to receive a ladder rung.

2. In combination with a hose and nozzle, a member which extends longitudinally of said hose from a point adjacent said nozzle rearwardly along said hose, means attaching said member to said hose so that it is held in a substantially fixed relation to said nozzle, a pair of hand grips attached to and in aligned relation along said longitudinal member and positioned to extend radially of said hose, one of said hand grips being located adjacent the rearward end of said nozzle, and the other of said hand grips being located at a point to the rear of said one hand grip and spaced therefrom, said one hand grip being attached to said longitudinal member by a pivotal connection and including a cut-away portion proportioned to receive a ladder rung, a latch for closing said cut-away portion to define a closure for said ladder rung and a two position lock for selectively engaging said one handle to said longitudinal member for immobilizing the pivotal action of said one hand grip about said pivotal connection.

3. In combination with a hose and nozzle, a member which extends longitudinally of said hose from a point adjacent said nozzle rearwardly along said hose, means attaching said member to said hose so that it is held in a substantially fixed relation to said nozzle including at least one member on said longitudinal member which is proportioned to fit around said hose and which is proportioned so that it is slightly smaller in cross section than said hose when said hose is under pressure and an opening in said member through which said hose may be inserted in said member when it is not under pressure, a pair of hand grips attached to said longitudinal member and positioned to extend radially of said hose, one of said hand grips being located adjacent the rearward end of said nozzle, and the other of said hand grips being located at a point to the rear of said one hand grip and spaced therefrom, said one hand grip being attached to said longitudinal member by a pivotal connection and including a cut-away portion proportioned to receive a ladder rung, a latch for closing said cut-away portion to define a closure for said ladder rung and a two position lock for selectively engaging said one handle to said longitudinal member for immobilizing the pivotal action of said one hand grip about said pivotal connection.

4. In combination with a hose and nozzle, which includes a coupling on said hose and a coupling on said nozzle which are adapted to be interconnected, a member which extends longitudinally of said hose from a point adjacent said hose coupling rearwardly along said hose, means attaching said member to said hose so that it is held in a substantially fixed relation to said nozzle including at least one member on said longitudinal member which is proportioned to fit around said hose and which is proportioned so that it is slightly smaller in cross section than said hose when said hose is under pressure and an opening in said member through which said hose may be inserted in said member when it is not under pressure and means attached to the forward end of said longitudinal member which is adapted to be clamped between said hose coupling and said nozzle coupling, a pair of hand grips attached to said longitudinal member and positioned to extend radially of said hose, one of said hand grips being located adjacent the rearward end of said nozzle, and the other of said hand grips being located at a point to the rear of said one hand grip and spaced therefrom.

5. In combination with a hose and nozzle which includes a coupling on said hose and a coupling on said nozzle which are adapted to be interconnected, a member which extends longitudinally of said hose from a point adjacent said nozzle rearwardly along said hose, means attaching said member to said hose so that it is held in a substantially fixed relation to said nozzle including at least one member on said longitudinal member which is proportioned to fit around said hose and which is proportioned so that it is slightly smaller in cross section than said hose when said hose is under pressure and an opening in said member through which said hose may be inserted in said member when it is not under pressure and a ring attached to the forward end of said longitudinal member which is adapted to be clamped between said hose coupling and said nozzle coupling, a pair of hand grips attached to said longitudinal member and positioned to extend radially of said hose, one of said hand grips being located adjacent the rearward end of said nozzle, and the other of said hand grips being located at a point to the rear of said one hand grip and spaced therefrom, said one hand grip being attached to said longitudinal member by a pivotal connection and including a cut-away portion proportioned to receive a ladder rung, a latch for closing said cut-away portion to define a closure for said ladder rung and a two position lock for selectively engaging said one handle to said longitudinal member for immobilizing the pivotal action of said one hand grip about said pivotal connection.

References Cited in the file of this patent

UNITED STATES PATENTS

| | | |
|---|---|---|
| 473,716 | Stevens | Apr. 26, 1892 |
| 1,840,488 | Connell | Jan. 12, 1932 |
| 1,862,053 | Grant | June 7, 1932 |
| 1,876,718 | McPherson | Sept. 13, 1932 |
| 2,134,347 | Thompson | Oct. 25, 1938 |
| 2,347,755 | Spreng | May 2, 1944 |